United States Patent [19]
Rock et al.

[11] Patent Number: 5,491,976
[45] Date of Patent: Feb. 20, 1996

[54] VEHICLE EMISSION AIR INJECTION

[75] Inventors: Jeffrey A. Rock, West Henrietta; Kenneth J. Dauer, Avon; William H. Pettit, Rochester; Donald D. Stoltman, Henrietta; James O. Wilson, Perry, all of N.Y.

[73] Assignee: General Motors Corporation, Detroit, Mich.

[21] Appl. No.: 305,616

[22] Filed: Sep. 14, 1994

[51] Int. Cl.$^6$ ........................................ F01N 3/22
[52] U.S. Cl. ............................ 60/289; 137/506; 137/510; 137/614.2
[58] Field of Search ................ 60/289, 274; 137/506, 137/510, 614.2

[56] References Cited

U.S. PATENT DOCUMENTS

| | | | |
|---|---|---|---|
| 3,910,040 | 10/1975 | Garcea | 60/277 |
| 3,942,321 | 3/1976 | Eckhardt et al. | 60/289 |
| 4,178,755 | 12/1979 | Klimazewski et al. | 60/290 |
| 4,269,028 | 5/1981 | Hattori | 60/276 |
| 4,342,194 | 8/1982 | Paddock et al. | 60/290 |
| 4,370,102 | 1/1983 | Sasaki et al. | 417/296 |
| 4,630,642 | 12/1986 | Detweiler | 137/506 |
| 5,065,575 | 11/1991 | Cook et al. | 60/290 |
| 5,301,504 | 4/1994 | Bertling et al. | 60/307 |

*Primary Examiner*—Douglas Hart
*Attorney, Agent, or Firm*—Ernest E. Helms

[57] ABSTRACT

A valve for an automotive vehicle emission system is provided which includes a valve housing with an inlet communicating the valve housing with an air pump; an outlet fluidly communicating the valve with a catalytic converter, the outlet having a check valve preventing flow from an engine exhaust conduit through the valve to the air pump; an upper diaphragm in the valve housing creating a first chamber in the housing which is fluidly exposed to the inlet; a lower diaphragm in the housing creating a second chamber between itself and the first diaphragm, the lower diaphragm forming a third chamber between itself and the housing generally opposite the first chamber; a sealing wall located within the housing separating the second chamber from the inlet, the sealing wall having a surface forming a valve seat with the lower diaphragm, dividing the inlet from the second chamber; a spring urging the lower diaphragm toward the first chamber; and a valve stem connecting the upper and lower diaphragms wherein the air pressure within the lower chamber causes a generally equal force on the upper diaphragm to move in a first direction as it causes on the lower diaphragm to move in a second direction opposite from the first direction, moving the lower diaphragm away from the sealing wall.

9 Claims, 4 Drawing Sheets

VEHICLE EMISSION AIR INJECTION

FIELD OF THE INVENTION

The field of the present invention is that of check valves utilized in emission control systems with supplemental catalytic converter heaters or air injection reaction systems.

BACKGROUND OF THE INVENTION

Supplementary catalytic converter heaters or air injection reaction systems may be required to meet future vehicle exhaust emissions regulation for low emission vehicles (LEV) or ultra-low emission vehicles (ULEV). Such pollution control schemes may incorporate an air-moving device to provide air for combustion heating of the converter or to promote thermal oxidation reactions within it. If these systems are periodically deactivated to conserve energy, some sort of air injection valve with a check function must isolate the air pump or blower from hot exhaust gases.

The nature of a reciprocating, internal combustion engine exhaust system complicates the air injection valve design requirements somewhat. The average back pressure 82 will rise with increments in engine speed 84 and load or vehicle speed 86 (see FIG. 3). A sudden throttle maneuver or an after-fire (undesired combustion of a misfired cylinder charge within the exhaust system) can generate transient pressure spikes. Additionally, exhaust pressure 92 during an idle or other low speed, light load conditions 94 will oscillate above and below atmospheric pressure (see FIG. 4). Unless the air injection valve is designed carefully, the negative portions of this characteristic trace could permit the converter to draw in undesirable excess oxygen.

Singular, existing valve conventions have various shortcomings. When open, ball-check, reed, umbrella and other one-way type valves are characterized by an inherent pressure loss. Additionally, back flow sealing capability is dependent on the pressure differential and spring force available when closed. Effective sealing against the aforementioned idling exhaust system pulsations would significantly compromise open position pressure drop. Use of a poppet-type, direct acting solenoid valve is restricted by existing direct current coil technology. The severe underhood temperature and operating voltage extremes are costly design constraints. Moreover, limited stroke potential would necessitate a large orifice and hence a large current-robbing coil. Although a piloted diaphragm-type solenoid valve could operate with a short stroke and small coil, these designs sacrifice response and often impose a parasitic pressure drop to open.

Clouding the issue further, intake manifold vacuum may not be available as the driving force for a diaphragm-assisted valve. Some air induction type pollution control devices may need to be activated prior to or during an engine cranking event. Ultimately, future non-throttling internal combustion engines may have no manifold vacuum at all.

SUMMARY OF THE INVENTION

To meet the above-noted challenges, the present invention is brought forth. The present invention brings forth a single valve which in a preferred embodiment provides a check valve function and also provides a balance valve which will not be unseated due to engine-created pressure pulsations from the exhaust system, thereby protecting the air pump and preventing excess oxygen being delivered to the converter.

DESCRIPTION OF THE PREFERRED EMBODIMENT

Figure 1:
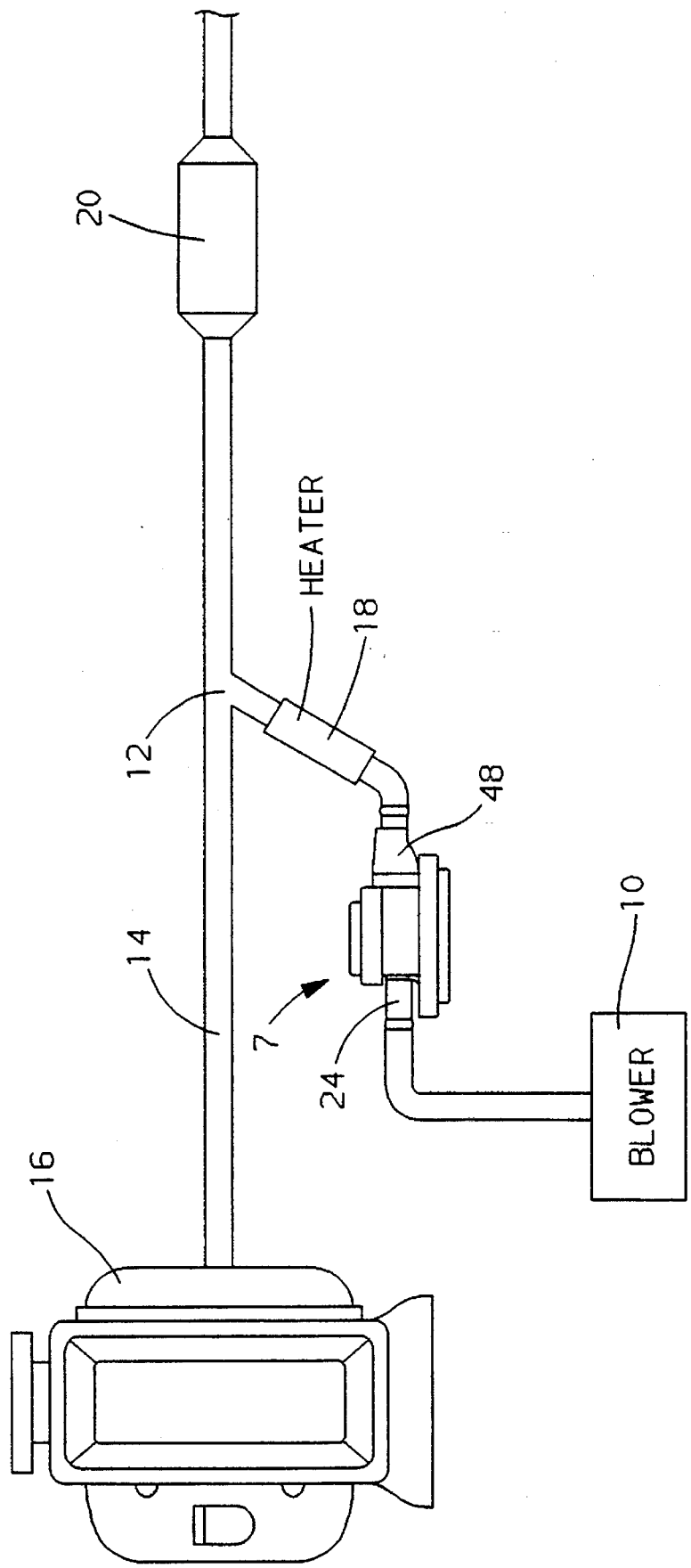
FIG. 1 is a schematic view of a preferred embodiment valve according to the present invention being utilized in an engine exhaust system having a supplemental catalytic converter.

Referring to FIG. 1, the present inventive air injection valve 7 is shown being fluidly connected to an air blower or pump 10. The air blower 10 delivers air through the valve 7 to a connection 12 with the exhaust manifold or conduit 14 of an internal combustion engine 16. Downstream, the conduit 14 is connected to a catalytic converter 20. Between the air blower 10 and the connection 12 is a catalytic heater 18.

Figure 2:
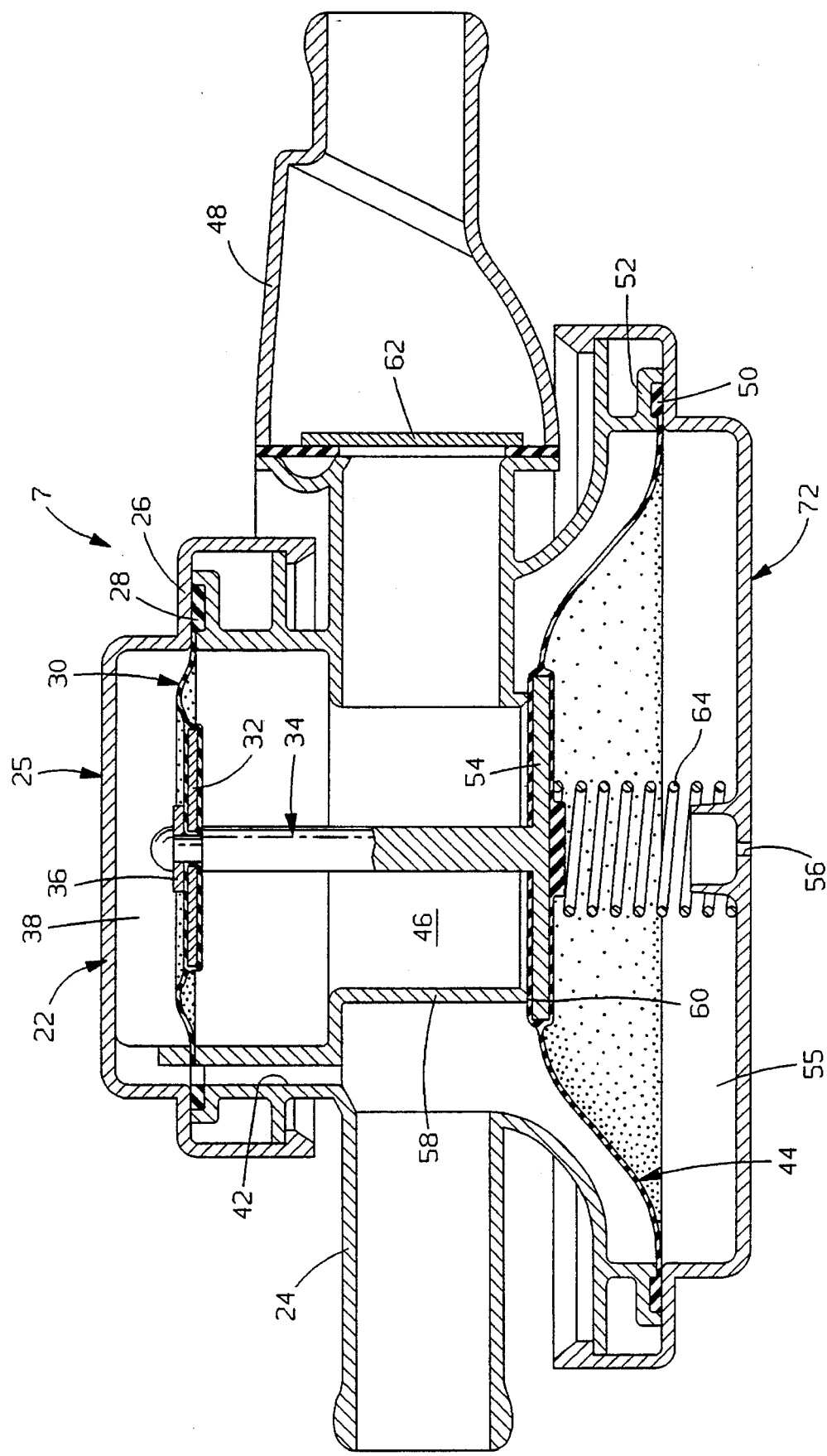
FIG. 2 is a sectioned view of a preferred embodiment valve according to the present invention.

Referring additionally to FIG. 2, the valve has a housing 22. Fluidly communicating the valve housing with the air blower 10 is an inlet 24. Fluidly connecting the valve housing 22 with the catalytic converter (via the burner) is a valve outlet 48.

The valve housing 22 includes an upper cover 25 with a flange section 26 which entraps a bead 28 of an upper or first diaphragm 30. The first diaphragm 30 has a central disk 32 and is held to a valve stem 34 by a keeper 36. The first diaphragm 30 forms between itself and the housing 22 a first pressure chamber 38. The first pressure chamber 38 is fluidly exposed to the inlet 24 via a passageway 42.

Connected to the opposite end of the valve stem 34 is a lower or second diaphragm 44. The second diaphragm creates within the housing a second pressure chamber 46 between itself and the upper diaphragm. The second pressure chamber 46 has unidirectional fluid communication with the housing outlet 48. The second diaphragm 44 has a bead 50 trapped between a midportion 52 of the housing and a lower cover 72. Additionally, the second diaphragm has an elastomeric coated disk 54 which in a preferred embodiment may be integral with the valve stem 34. Below itself and with the lower cover, the second diaphragm 44 provides a third pressure chamber 55 which is vented to the atmosphere through a vent hole 56.

A seal chamber wall 58 is located within the housing 22, separating the second chamber 46 from the inlet 24 and provides an annular valve seat 60 with the central disk 54 of the second diaphragm 44. At the outlet 48 of the valve 7, there is a swing flapper check valve 62. Although it is possible to place the check valve 62 at the inlet 24, it is preferable to place it in the outlet 48. Additionally, the check valve 62 may be separated from the valve 7; however, it is preferable to keep it in the same unit for reasons of expense.

In operation during the initial startup of the engine 16, the air blower 10 will be signalled on and the pressurized air from the inlet 24 will go into the first chamber 38. Additionally, pressurized air will act on the second diaphragm 44, pushing it toward the third chamber 55. The forces on both diaphragms 30 and 44 will cause the valve stem 34 to go down against the slight spring force of a return spring 64, allowing pressurized air to exit out the swing flapper check valve 62 into the air heater 18. If a sudden pressure spike should occur in the exhaust system, the air blower 10 will be protected due to the swing flapper check valve 62.

Figure 3:
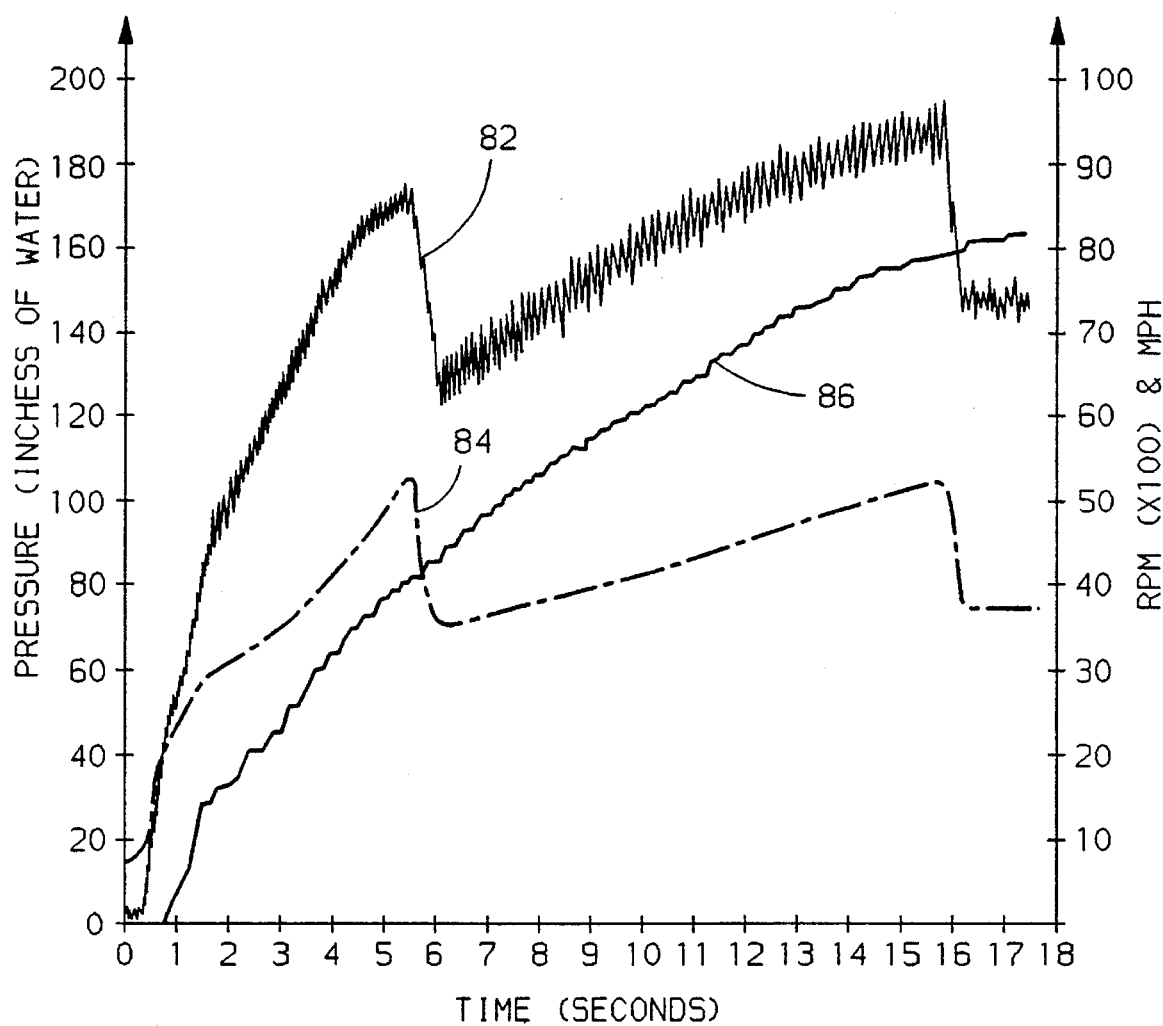
FIG. 3 is a chart demonstrating the relationship between engine speed/vehicle speed and exhaust (back) pressure.
Figure 4:
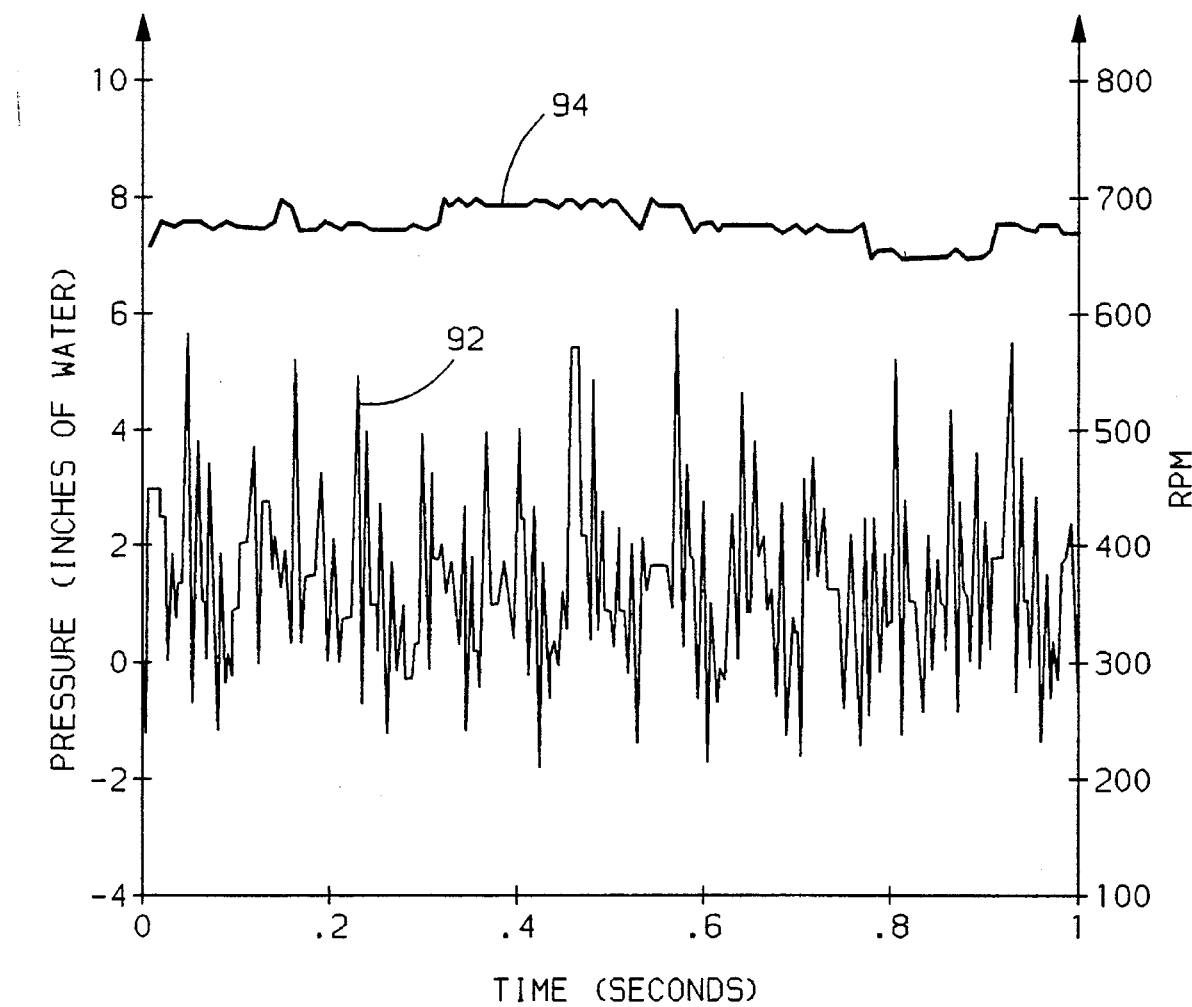
FIG. 4 is a chart demonstrating oscillation of exhaust pressure during idle or low speed.

Referring to FIGS. 3 and 4, in a situation where pressure fluctuations exist in the exhaust conduit 14 due to the operation of the engine, especially after the air blower 10 has been shut off, it is desirable to keep the pressure fluctuations from inadvertently allowing air to either go back to the blower 10 or be sucked through the valve inlet 24 to the catalytic converter 20 (via the heater 10), causing a decrease in emission efficiency. To prevent such occurrences, the valve 7 is balanced; that is, the force (resultant of the air pressure in the second chamber 46) acting on the second diaphragm 44 (the portion of the second diaphragm 44 sealed by the seal wall 58) in the downward direction will be generally equal to the force acting on the first diaphragm 30 in an upward direction. Therefore, pressure fluctuations which may cause the flapper check valve 62 to flutter will not unseat the second diaphragm 44 from the sealing chamber wall valve seat 60.

Typically, the first diaphragm 30 will be slightly larger than the portion of the second diaphragm 44 that contacts with the valve seat 60 due to the weight of the valve stem 34 and for the need of a slight compression of the elastomeric material on the disk 54 with the sealing chamber wall valve seat 60. However, the return spring 64 will not be so stiff to impede the opening of the valve 7 during normal operation. Additionally, flexibility and bend configurations of the diaphragms must be considered as well as the orientation of the mounting of the valve housing (vertical, horizontal, inclined). Those familiar with the art will realize that the valve 7 may be reduced in diameter if the vent 56 is connected to a vacuum manifold of the engine 16.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. In an automotive vehicle emission system having an internal combustion engine, an engine exhaust conduit, a catalytic converter fluidly communicating with the conduit, an air pump for injecting pressurized air into the catalytic converter and an air injection valve fluidly communicating the air pump with the catalytic converter, the air injection valve comprising:

a valve housing;

a valve inlet fluidly communicating the valve housing with the air pump;

a valve outlet fluidly communicating the valve housing with the catalytic converter;

a first diaphragm in the housing creating a first chamber in the housing, the first chamber being fluidly exposed to the valve inlet;

a second diaphragm in the housing creating a second chamber between itself and the first diaphragm, and a third chamber between itself and the housing generally opposite the first chamber;

a seal wall located within the housing separating the second chamber from the inlet having a surface forming a valve seat with the second diaphragm between the inlet and the second chamber; and a valve stem connecting the first and second diaphragms wherein the air pressure within the second chamber causes a generally equal force on the first diaphragm toward the first chamber to move in a first direction as is caused by the pressure on the second diaphragm to move the second diaphragm from the seal wall in a second direction toward the third chamber.

2. An air injection valve as described in claim 1 further including a check valve preventing flow toward the air pump.

3. An air injection valve as described in claim 2 wherein the check valve is in the injection valve outlet.

4. An air injection valve as described in claim 1 wherein the first valve has centrally located therein a generally hardened disk.

5. An air injection valve as described in claim 1 wherein the second diaphragm has a centrally located disk.

6. An air Injection valve as described in claim 1 wherein the third chamber is vented to the atmosphere.

7. An air injection valve as described in claim 1 further including a spring acting upon the second diaphragm, urging the second diaphragm in a direction toward the second chamber.

8. An air injection valve as described in claim 1 having an elastomeric interface between the second diaphragm and the seal wall.

9. In an automotive vehicle emission system having an internal combustion engine, an engine exhaust conduit, a catalytic converter connected to the conduit, an air pump for injecting pressurized air into the exhaust conduit between the engine and the catalytic converter, and an air injection valve fluidly communicating the air pump with the engine exhaust conduit between the catalytic converter and the engine, the air injection valve comprising:

a valve housing;

a valve inlet fluidly communicating the valve housing with the air pump;

a valve outlet fluidly communicating the valve housing with the catalytic converter, the valve outlet having a check valve therein preventing flow from the exhaust conduit through the air injection valve to the air pump;

a first diaphragm in the housing creating a first chamber in the housing, the first chamber being fluidly exposed to the valve inlet;

a second diaphragm in the housing having a central disk, the second diaphragm creating a second chamber between itself and the first diaphragm, and the second diaphragm forming a thin chamber between itself and the housing generally opposite the first chamber, the third chamber being vented to the atmosphere;

a sealing wall located within the housing separating the second chamber from the inlet, the sealing wall having a surface forming a valve seat with the disk of the second diaphragm, dividing the inlet from the second chamber;

a spring urging the disk of the second diaphragm toward the first chamber; and a valve stem connecting the first and second diaphragms wherein the air pressure within the second chamber causes a generally equal force on the first diaphragm to move in a first direction as it causes on the second diaphragm to move in a second direction opposite from the first direction, moving the second diaphragm away from the sealing wall.

\* \* \* \* \*